Sept. 21, 1965 W. L. MACK 3,207,203
FUEL TANK WITH RESERVE COMPARTMENT
Filed Dec. 31, 1963
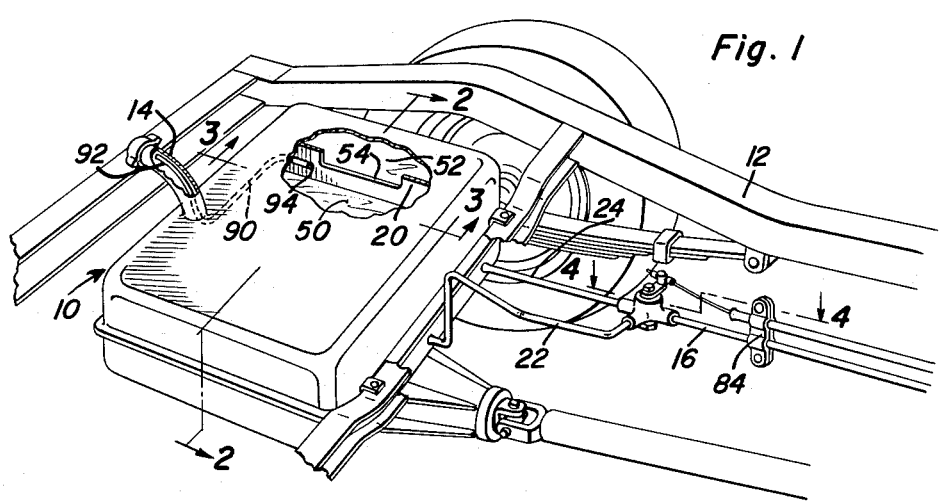
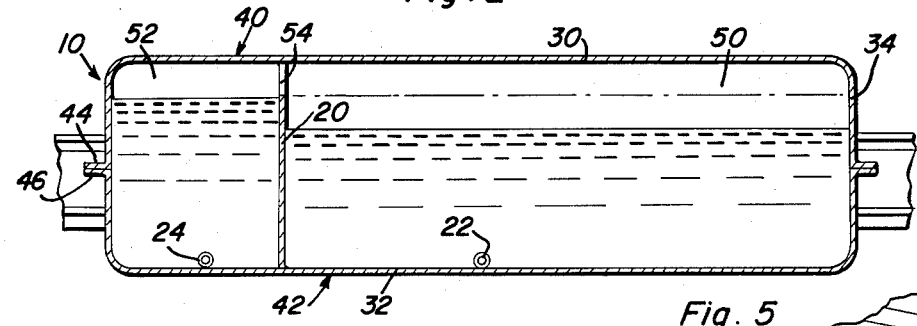
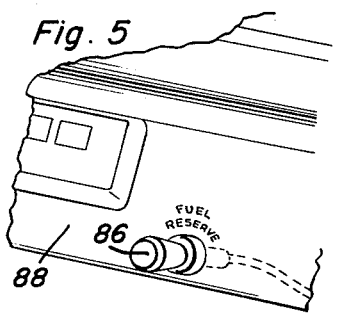
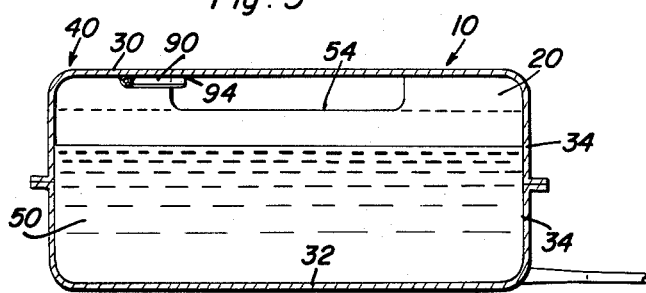
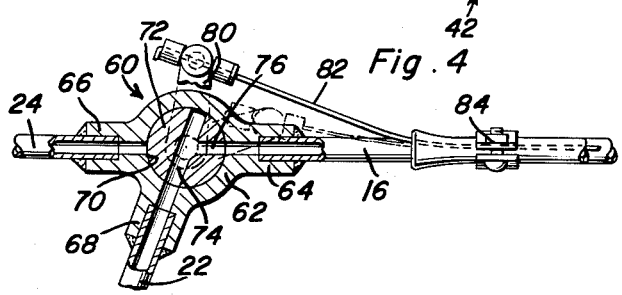
Wilbur L. Mack
INVENTOR.

United States Patent Office 3,207,203
Patented Sept. 21, 1965

3,207,203
FUEL TANK WITH RESERVE COMPARTMENT
Wilbur L. Mack, 168 Laurel St., Willits, Calif.
Filed Dec. 31, 1963, Ser. No. 334,793
3 Claims. (Cl. 158—46.5)

This invention comprises a novel and useful fuel tank with reserve compartment. Although illustrated and specifically adapted for use in the fuel supply system of a motor vehicle to insure the maintaining of a reserve fuel supply in the fuel tank thereof, the invention is also generally applicable to liquid storage systems in which a liquid is delivered from a storage tank and wherein it is desirable to maintain a reserve supply of liquid within the tank.

Either through carelessness or from circumstances beyond their control or of which they are unaware, motorists are continually running out of fuel. Not only is this situation vexatious but is sometimes fraught with danger and a considerable degree of discomfort, delay or other hardship.

Heretofore efforts have been made to insure the provision of a reserve supply of fuel within the motor vehicle for such contingencies. However, such prior attempts at solving the problem have not been entirely successful owing to various causes as, for example, the inconvenience and difficulty of introducing the reserve supply of fuel from a separate container into the fuel tank of the vehicle especially under conditions of inclement weather and the like. Further attempts to maintain a supply of reserve fuel within the main fuel tank of the vehicle usually involves a rather complicated apparatus and piping connections which in themselves are subject to various troubles and difficulties of uncertain operation.

It is therefore the primary purpose of this invention to provide an effective solution to the problem of inadvertently exhausting the supply of fuel in the main vehicle fuel tank.

A further object of the invention is to provide a fuel tank which shall contain a reserve compartment therein which is normally out of communication with the engine but may be placed in communication when the main fuel supply has been inadvertently exhausted.

Yet another object of the invention is to provide a device in accordance with the preceding objects wherein the reserve supply of fuel may be placed in operation with a minimum of effort and from the driver's seat without the necessity for the latter leaving the vehicle.

A still further object of the invention is to provide a device in accordance with the preceding objects which shall not reduce the capacity of the fuel tank to any appreciable extent and wherein the reserve supply is automatically refilled when the tank itself is refilled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the rear portion of a motor vehicle chassis showing the vehicle fuel tank with a portion broken away and with the invention installed therein;

FIGURE 2 is a vertical longitudinal sectional view through the fuel tank taken upon an enlarged scale and substantially upon the plane indicated by the section line 2—2 of FIGURE 1;

FIGURE 3 is a view in vertical transverse section through the tank and is taken upon an enlarged scale substantially upon the plane indicated by the section line 3—3 of FIGURE 1;

FIGURE 4 is a detail view in horizontal longitudinal section taken upon an enlarged scale substantially upon the plane indicated by the section line 4—4 of FIGURE 1 and showing the selector control valve for the main reserve fuel supply compartments of the fuel tank; and FIGURE 5 is a detail view in perspective showing the remote control means for the selector valve.

Indicated generally by the numeral 10 is the fuel storage tank of a motor vehicle, a portion of the chassis of which is indicated by the numeral 12. As shown, the tank is mounted in the usual location at the rear of the vehicle, being provided with the customary filler pipe 14 and having the fuel supply or delivery conduit 16 by which fuel is supplied from the bottom of the fuel tank to the appropriate accessories of the vehicle engine, not shown, in a well understood manner. Customarily, the delivery conduit 16 communicates directly with the bottom of the fuel tank which has an unobstructed interior therein.

In accordance with this invention, however, the interior of the fuel tank is altered by providing a partition 20 therein and by connecting the fuel delivery conduit 16 by means of a pair of branch conduits 22 and 24 to the interior of the tank 10 upon opposite sides of the partition 20.

Referring now particularly to FIGURES 1–3, it will be observed that the fuel tank 10 includes a top 30, bottom 32 and an enclosing side wall 34 which is sealed to the top and bottom in a fluid-tight manner and therewith defines the hollow interior of the tank. In order to facilitate fabrication of the compartmented tank of this invention, the tank preferably consists of two complementary sections, these being an upper section indicated generally by the numeral 40 and a lower section indicated at 42 and which are joined together by laterally projecting cooperating flanges 44 and 46.

The partition 20 previously mentioned is disposed within the tank and preferably extends from the bottom to the top wall thereof being also engaged at its opposite ends with the side wall 34. Preferably the edges of the partition 20 are welded or otherwise joined in a fluid-tight manner with the top or bottom and side walls to thus separate or divide the interior of the tank into a relatively large main compartment 50 and a relatively small reserve compartment 52. Obviously, the partition may be so placed as to obtain any desired proportion between the volumes of these two compartments.

As shown in FIGURE 2, the branch conduits 22 and 24 enter these two compartments 50 and 52, respectively, adjacent their bottom portions.

A passage means is provided through the partition for establishing continuous communication between the two compartments. This passage means preferably comprises a notch or opening 54, see FIGURE 3, which is disposed at the upper edge of the partition. The notch extends downwardly a sufficient depth so as to provide a lower edge at a predetermined height above the bottom 32. Consequently, when the liquid level in the tank drops below the lower edge of the notch 54, there will be a reserve supply maintained in the compartment 52 by the partition 20 which acts as a dam therefor. It will be observed that this passage means being continuously open enables both compartments to be filled when the tank is filled through the filler pipe 14 in a conventional manner.

As shown, the partition 20 extends transversely across the tank from the front portion of the side wall to the back portion thereof. However, it will be appreciated that the partition may be of any desired shape and size and may have its opposite ends bonded to the side walls at any desired locations thereon.

A selector or control valve assembly indicated generally by the numeral 60 is interposed between the delivery conduit 16 and the two branch conduits 22 and 24. This valve assembly, as shown best in FIGURE 4, includes a valve housing 62 having tubular bosses 64, 66 and 68 to which the conduits 16, 24 and 22, respectively are connected. The valve housing has a cylindrical valve chamber 70 therein which rotatably receives a cylindrical three-way valve 72. The latter includes annular related valve passages 74 and 76 positioned for selective registry of the branch conduits 22 and 24 with the delivery or supply conduit 16 in a manner which will be readily understood from an inspection of FIGURE 4. The valve is provided with an operating lever as at 80 to which is secured the control cable as at 82 mounted by suitable supporting brackets as at 84 upon the fuel delivery conduit 16. Control cables preferably of the Bowden wire type are connected to the remote control means in the form of a control knob 86 disposed upon the dash portion 88, see FIGURE 5, of the motor vehicle. The arrangement is such that by pushing or pulling upon the cable 82 through manipulation of the control knob 86, the selector valve 72 may be oscillated to selectively place the main fuel supply in the compartment 50 or the reserve fuel supply in the compartment 52 in communication with the delivery conduit 16.

As will now be understood, the device will ordinarily run with the control valve positioned to place the main fuel supply through the branch conduit 22 in connection through the delivery conduit 16 with the engine of the vehicle. This is the position shown in FIGURE 4. However, if the vehicle inadvertently runs out of fuel, the driver need merely adjust or manipulate the knob 86 on the dash whereupon the valve may be rotated to place the passage 74 in communication with the branch conduit 24 and thus place the reserve fuel supply compartment 52 in communication with the engine.

The conventional vehicle gas tank is provided with a vent pipe establishing communication between the filler pipe inlet and a remote portion of the upper portion of the tank whereby to prevent the entrapment of air by the inflowing fuel. This same principle is adhered to in this invention.

A vent pipe 90 has one end at 92 disposed in the filter pipe 14 as the inlet end thereof. The pipe 90 has its inlet end 94 disposed adjacent the partition 20 and preferably in the notch 54. Thus as the incoming fuel fills the tank 10 the air is expelled through the vent tube 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A liquid storage system comprising a storage tank having a top and a bottom and a surrounding side wall joined to said top and bottom and forming an interior closed to the atmosphere, a partition extending across said interior from side to side thereof and joined at its bottom, top and opposite ends in a fluid tight engagement with said tank bottom, top and side walls, respectively and dividing thereby said tank interior into a larger main compartment and a smaller reserve compartment, a filling opening for said tank opening into said main compartment, a passage through said partition at a predetermined height above said bottom wall establishing continuous free communication between said compartments at their upper portions, an air vent tube having one end disposed in said filling opening and having its other end terminatig in said tank at said passage, a delivery conduit for receiving liquid from said storage tank, valved branch conduits each connecting said delivery conduit with one of said compartments at the bottom thereof.

2. The combination of claim 1 including a control valve selectively and alternately connecting each branch conduit to said delivery conduit and controlling flow from said branch conduits to said delivery conduit.

3. The combination of claim 1 wherein said passage comprises a notch in the upper edge of said partition.

References Cited by the Examiner

UNITED STATES PATENTS 1,398,334  11/21  Lutsky _____ 158—46.5
1,469,937  10/23  Hutchinson _____ 158—46.5
1,555,657   9/25  Glenn _____ 158—46.5

JAMES W. WESTHAVER, *Primary Examiner.*

FREDERICK KETTERER, *Examiner.*